United States Patent [19]
Thomas

[11] Patent Number: 5,315,780
[45] Date of Patent: May 31, 1994

[54] LAWN EDGING MATERIAL ANCHORING ARRANGEMENT

[76] Inventor: James E. Thomas, 2344 W. Harrison St., Chicago, Ill. 60612

[21] Appl. No.: 916,280

[22] Filed: Jul. 21, 1992

[51] Int. Cl.$^5$ .............................................. A01G 1/00
[52] U.S. Cl. ......................................... 47/33; 52/102; 47/56
[58] Field of Search ................. 47/33, 56, 73, 48.5; 52/102

[56] References Cited

U.S. PATENT DOCUMENTS

| | | | |
|---|---|---|---|
| 1,380,253 | 5/1921 | Rodger | 47/56 |
| 3,005,287 | 10/1961 | Dudley | 47/48.5 |
| 3,188,771 | 6/1965 | Ballai | 47/48.5 |
| 3,515,373 | 6/1970 | Abbe | 47/33 |
| 4,361,983 | 12/1982 | Wilson | 47/48.5 |
| 5,121,569 | 6/1992 | Thomas | 47/33 |
| 5,172,517 | 12/1992 | Thomsen | 47/83 |

FOREIGN PATENT DOCUMENTS 73337  6/1894  Fed. Rep. of Germany ....... 47/48.5

*Primary Examiner*—Henry E. Raduazo
*Attorney, Agent, or Firm*—Richard W. Carpenter

[57] ABSTRACT

An anchoring arrangement for lawn edging material of the type used for defining borders of lawns and gardens. The edging material is formed of a resilient, extruded, molded plastic material and includes a relatively thin vertical wall member, which preferably has a retaining flange projecting laterally outward from a lower end thereof. The primary feature of the invention is the provision of hollow tubes that extend through the edging material and are adapted to hold plant seeds until they germinate and mature, so that the roots of the plants will anchor the material in place in the ground.

20 Claims, 1 Drawing Sheet

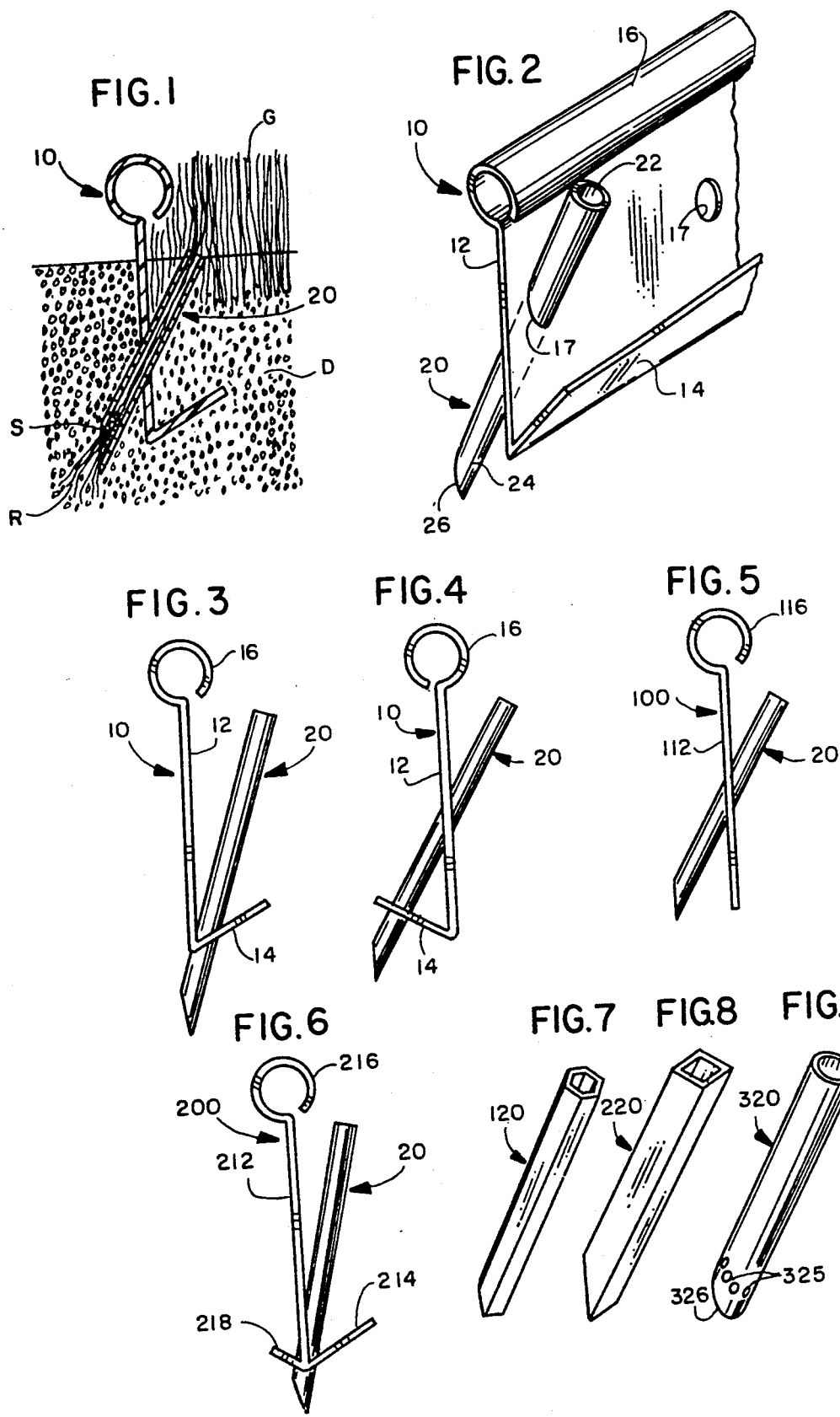

LAWN EDGING MATERIAL ANCHORING ARRANGEMENT

BACKGROUND OF THE INVENTION

1. Field of the Invention

This invention relates to lawn edging material of the type used to form lawn or garden borders, and more particularly to an anchoring arrangement for retaining lawn edging material in place in the ground. The arrangement includes a plurality of longitudinally spaced tubes adapted to hold plant seeds whose roots serve to anchor the material in the ground after the seeds have germinated and the plants have matured.

2. Description of the Background Art

A background art search directed to the subject matter of this application conducted in the United States Patent and Trademark Office disclosed the following U.S. Pat. Nos. 2,571,491; 2,281,927; 2,812,618; 3,387,786; 3,472,133; 3,485,449; 3,788,001; 3,841,022; 4,080,755; 4,281,473; 4,321,769; 4,353,183; 4,442,627; 4,644,685; 4,761,923; 4,846,655.

None of the patents uncovered in the search discloses an anchoring arrangement for lawn edging material that includes longitudinally spaced seed holding tubes for holding plant seeds and having openings that allow roots of plants to pass out of the tubes and into the ground, so that after the seeds have germinated the plant roots can anchor the material in the ground.

SUMMARY OF THE INVENTION

It is an object of the present invention to provide an improved lawn edging material of the type used to define borders of lawns and gardens.

Another object of the invention is the provision of an anchoring arrangement for lawn edging material, of the type described, that is easy to work with and which will keep the edging material in position in the ground.

Another important object of the invention is to provide a lawn edging material anchoring arrangement that can be made a part of the edging material, at the time the material is formed, or can be used with lawn convention edging material after the material has already been formed.

A more specific object of the invention is the provision of a lawn edging material that includes a plurality of longitudinally spaced seed holding tubes secured to the vertical and/or laterally extending wall portions of the material and adapted to hold plant seeds, so that, when the seeds germinate and the plants mature, the roots of the plants can pass out of the tubes and into the ground to anchor the material and prevent it from coming up out of the ground.

These and other objects of the invention will be apparent from an examination of the following description and drawings.

BRIEF DESCRIPTION OF THE DRAWINGS

FIG. 1 is a vertical cross-sectional view of a lawn edging material anchoring arrangement embodying features of the present invention;

FIG. 2 is a fragmentary isometric view of the structure illustrated in FIG. 1;

FIGS. 3 and 4 are end elevational views of the structure illustrated in FIG. 2, but with the seed holding tubes shown in slightly different positions relative to the vertical wall member;

FIGS. 5 and 6 are view are views similar to that of FIG. 3, but illustrating slightly different forms of the vertical wall member; and FIGS. 7-9 are isometric views of seed holding tubes of the type illustrated in previous views, but showing slightly different forms of the tubes.

It will be understood that, for purposes of clarity, certain elements may have been intentionally omitted from certain views where they are believed to be illustrated to better advantage in other views.

DESCRIPTION OF THE PREFERRED EMBODIMENT

Referring now to the drawings for better understanding of the invention, and particularly to FIGS. 1 and 2, it will be seen that lawn edging material embodying features of the invention, and indicated generally at 10, is shown positioned in the ground surrounded by dirt D.

The material is shown holding plant seeds S. The upper portions of the plants, such as the blades of grass G, are shown extending above the surface the ground, and the roots R of the plants are shown extending downwardly and out of a seed holding tube, indicated generally at 20, to anchor the material in the ground.

The edging material 10 comprises a generally flexible, elongated strip that can be formed as a continuous piece by extrusion molding. It can then be cut to desired individual lengths, which, before being placed in the ground, can be attached to each other in end-to-end telescoping relationship.

As best seen in FIGS. 1 and 2, the lawn edging material 10 comprises a relatively thin, flat, vertically extending wall member 12.

At its lower end the wall member may have, extending laterally outwardly therefrom, an integral flange member 14, and at its upper end vertical wall member 12 may be provided with an integral rail, or crown 16 extending the entire length of the wall member and serving to reinforce the wall member.

As best seen in FIG. 2, vertical wall member 12 is provided with a plurality of longitudinally spaced openings 17 adapted to receive therethrough a plurality of seed holding tubes indicated generally at 20.

Each of the seed holding tubes 20 comprises an elongated tubular body having an open upper end 22, through which seeds can be introduced as explained hereinafter, and an open lower end 24, through which roots of the plant seeds S can pass out of the tube after the seeds have germinated.

The lower end 24 of the tube member 20 is preferably tapered and provided with a relatively sharp edge as illustrated at 26.

The purpose of the seed holding tubes 20, as shown in FIG. 1, is to hold seeds until they germinate, so that, as the plants mature, their roots will extend downwardly and out of the tube into the ground where they will serve to anchor the lawn edging material and prevent it from coming up out of the ground.

The seed holding tubes 20 may be inserted in the various holes 17 of the vertical wall member 20 prior to positioning the material in the ground or they may be partially inserted at the time that the lawn edging material is placed in the trench in the ground and then hammered further into the ground where the tubes themselves also serve as a partial anchor in addition to the roots of the plants.

Since the tubes are provided with a sharp edge, they may be driven through a vertical member of an existing lawn edging material which has already been positioned in the ground.

The shape of the tubes may vary from hexagonal to rectangular to cylindrical, as illustrated in FIGS. 7, 8, and 9, respectively.

Also, the shape of the lawn edging material itself may vary. In the embodiment of the invention illustrated in FIG. 5, the lawn edging material 100 is shown as comprising only a vertical wall member 112 with a crown 116, but no lateral flanges.

In FIG. 6, the lawn edging material 200 is provided with a crown 216 and pair of flanges 214 and 218 extending outwardly from opposite sides of the vertical wall member 212.

In addition to having the tubes pass directly through the vertical wall member 12, as shown in FIG. 2, the tubes may be arranged and disposed to extend through the one or more flanges of the edging material or through both the vertical wall member and the flanges as illustrated in FIGS. 2-6.

Although in the preferred embodiment, the lower end of the tube is open, if desired the lower end of the tube may be closed, as indicated in FIG. 9, by a bottom wall 324. In this embodiment tube 320 is provided, adjacent its lower end, with a plurality of openings 325 through which the roots of a plant may pass into the ground and to anchor the edging material.

In all of the embodiments described above, the same basic principle and concept applies, namely, to provide lawn edging material that has a vertically extending wall member and that has a plurality of longitudinally spaced hollow seed holding tubes extending through the a portion of the material at longitudinally spaced intervals, so that seeds can be placed in the tube member and allowed to germinate, whereupon after germination the roots of the plants will extend out of the lower ends of the tube and anchor the lawn edging material permanently in the ground.

What is claimed is:

1. An anchoring arrangement, for molded plastic lawn edging material, of the type commonly used for defining borders of lawns and gardens, that is adapted to hold plant seeds, so that when such plants mature their roots will extend into the ground and help anchor the edging material, said arrangement comprising, in combination:
   (a) a relatively thin, flat, vertically disposed wall member having an upper portion, including an integral reinforcing rail adapted to be positioned above ground level, and having a lower portion adapted to be positioned below ground level;
   (b) a relatively thin, flat, flange member formed integrally with said wall member lower portion and disposed to project laterally outward from said wall member;
   (c) a plurality of longitudinally spaced, elongated, hollow, plant seed holding tubes disposed to extend in a generally vertical direction through at least one of said members;
   (d) each of said seed holding tubes having:
      (i) an open upper end adapted to be positioned above ground level to receive plant seeds inserted therein;
      (ii) an open lower end adapted to be positioned below ground level to allow roots of plants to pass from the tube into the ground, as the seeds germanate and the plants mature, whereby plant roots serve to anchor the edging material in the ground.

2. An arrangement according to claim 1, wherein each of said seed holding tubes is round in cross section.

3. An arrangement according to claim 1, wherein each of said seed holding tubes is rectilinear in cross section.

4. An arrangement according to claim 1, wherein each of said seed holding tubes is generally funnel shaped.

5. An arrangement according to claim 1, where said one member has extending therethrough, at longitudinally spaced intervals, plurality of openings each of which is adapted to receive a portion of one of said seed holding tubes.

6. An arrangement according to claim 1, wherein each of said seed holding tubes extends through said wall member.

7. An arrangement according to claim 1, wherein each of said seed holding tubes extends through said flange member.

8. An anchoring arrangement according to claim 1, wherein said one member has extending therethrough a plurality of longitudinally spaced openings adapted to receive said tubes.

9. An anchoring arrangement, for molded plastic lawn edging material, of the type commonly used for defining borders of lawns and gardens, that is adapted to hold plant seeds, so that when such plants mature their roots will extend into the ground and help anchor the edging material, said arrangement comprising, in combination:
   (a) a relatively thin, flat, vertically disposed wall member having an upper portion, adapted to be positioned above ground level, and having a lower portion adapted to be positioned below ground level;
   (b) a plurality of longitudinally spaced, elongated, hollow, plant seed holding tubes disposed to extend in a generally vertical direction through said member:
   (c) each of said seed holding tubes having:
      (i) an open upper end adapted to be positioned above ground level to receive plant seeds inserted therein;
      (ii) an open lower end adapted to be positioned below ground level to allow roots of plants to pass from the tube into the ground, as the seeds germanate and the plants mature, whereby plant roots serve to anchor the edging material in the ground.

10. An arrangement according to claim 9, wherein each of said seed holding tubes is round in cross section.

11. An arrangement according to claim 9, wherein each of said seed holding tubes is rectilinear in cross section.

12. An arrangement according to claim 9, wherein each of said seed holding tubes is generally funnel shaped.

13. An arrangement according to claim 9, where said one member has extending therethrough, at longitudinally spaced intervals, plurality of openings each of which is adapted to receive a portion of one of said seed holding tubes.

14. An anchoring arrangement according to claim 9, wherein said one member has extending therethrough a plurality of longitudinally spaced openings adapted to receive said tubes.

15. An anchoring arrangement according to claim 9, wherein each of said tubes presents, at its lower end, a relatively sharp edge adapted to facilitate forceful insertion of the tube through the member.

16. An anchoring arrangement, for molded plastic lawn edging material, of the type commonly used for defining borders of lawns and gardens, comprising:
(a) a wall member including a relatively thin, vertically disposed elongated strip of molded plastic material having an upper portion arranged and disposed to extend above ground level and a lower portion arranged and disposed to extend below ground level;
(b) at least one seed holding tube adapted for use with a plurality of similar tubes spaced longitudinally of said wall member, said tube being arranged and disposed to extend through said wall member in a generally vertical position and having a tubular body including:
(i) an upper end adapted to be positioned above ground level and having an opening to receive plant seeds inserted therein;
(ii) a lower end having adapted to be positioned below ground level to allow roots of plants to pass from the tube into the ground, as the seeds germinate and the plants mature, to help anchor the wall member of the lawn edging material in the ground.

17. An arrangement according to claim 16, wherein said seed holding tube is round in cross section.

18. An arrangement according to claim 16, wherein said seed holding tube is generally funnel shaped.

19. An arrangement according to claim 16, wherein said tube is closed at its lower end and has, extending through a side wall thereof adjacent said lower end, at least one opening to accomodate the passage of plant roots out of said tube.

20. An arrangement according to claim 16, wherein said tube lower end presents a relatively sharp point adapted to facilitate insertion of said tube through said wall member.

* * * * *